United States Patent [19]

West

[11] Patent Number: 4,523,261
[45] Date of Patent: Jun. 11, 1985

[54] LIGHT SOURCE, MANUALLY OPERATED

[76] Inventor: Philip G. West, Rte. 3, Box 215, Orange, Va. 22960

[21] Appl. No.: 405,632

[22] Filed: Aug. 5, 1982

[51] Int. Cl.³ .................. H04R 17/00; H04R 21/00
[52] U.S. Cl. .................................. 362/192; 310/339
[58] Field of Search .............. 361/260; 310/339; 362/3, 8, 20, 192, 253; 431/98; 354/135

[56] References Cited

U.S. PATENT DOCUMENTS

| 2,891,479 | 6/1959 | Alexander et al. | 310/339 |
| 3,106,080 | 10/1963 | Suits | 310/339 |
| 3,211,069 | 10/1965 | Rixton | 362/192 |
| 3,307,053 | 2/1967 | Furth | 310/339 |
| 3,363,566 | 1/1968 | Giattino et al. | 310/339 |
| 3,449,637 | 6/1969 | Suzuki | 310/339 |
| 3,528,354 | 9/1970 | Nakagawa | 431/358 |
| 3,576,471 | 4/1971 | Schumacher | 310/339 |
| 3,588,553 | 6/1971 | Westphal | 310/339 |
| 3,724,993 | 4/1973 | Goto | 310/339 |
| 3,751,690 | 8/1973 | Okamoto | 310/339 |
| 3,867,653 | 2/1975 | Duetze | 310/339 |
| 3,880,572 | 4/1975 | Haugsjaa et al. | 431/358 |
| 3,903,436 | 9/1975 | Moriya | 310/339 |
| 3,967,142 | 6/1976 | Beach | 310/339 |
| 4,256,991 | 3/1981 | Otala | 310/339 |
| 4,297,609 | 10/1981 | Hirao | 310/339 |
| 4,315,180 | 2/1982 | Kondo | 310/339 |

FOREIGN PATENT DOCUMENTS 1963756 10/1968 Fed. Rep. of Germany ...... 310/338

Primary Examiner—Ronald H. Lazarus
Attorney, Agent, or Firm—Robert F. Beers; Kenneth E. Walden; John C. LaPrade

[57] ABSTRACT

A manually operated light source powered by one or more piezoelectric crystals, with supporting apparatus including hammer and anvil means to apply high impact pressure of 7,000 psi and more to the crystal so that a high impulse voltage of very short duration is produced, with means to transmit the voltage to gas filled discharge tube to produce light. The hammer and anvil may be driven by gravity or by mechanical means.

1 Claim, 5 Drawing Figures

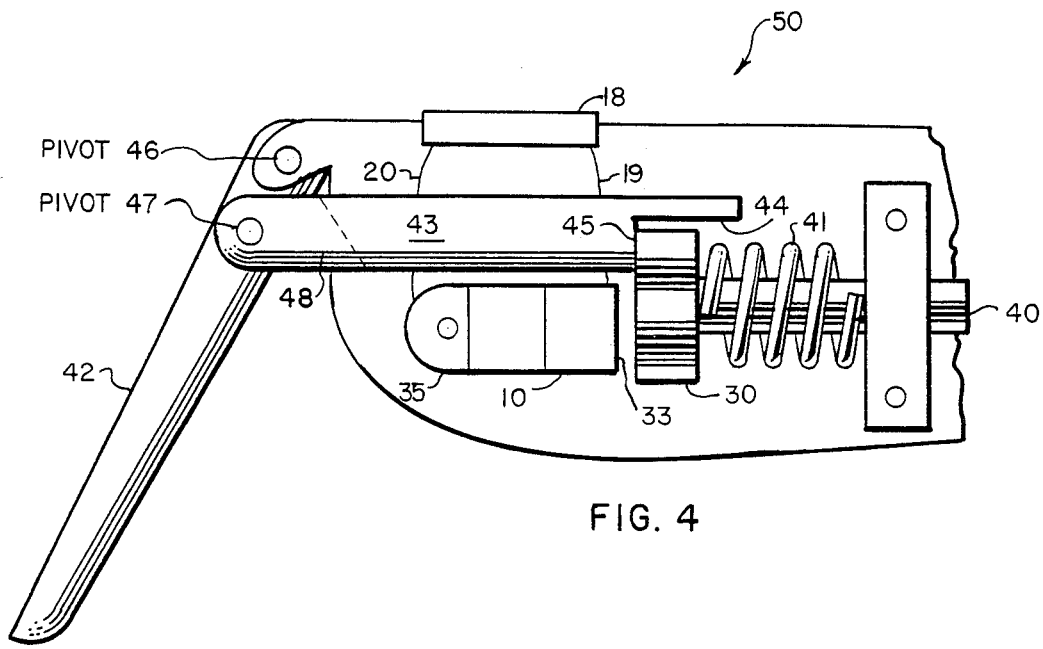
FIG. 5
FIG. 4
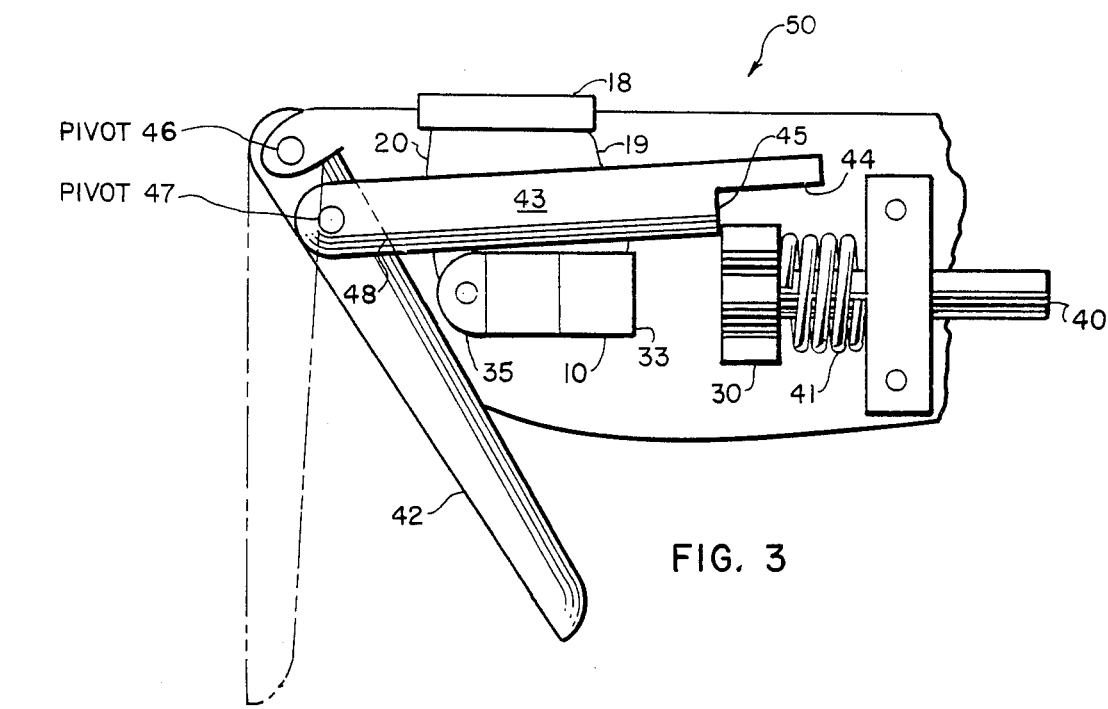
FIG. 3

LIGHT SOURCE, MANUALLY OPERATED

The invention described herein may be manufactured and used by or for the Government of the United States of America for governmental purposes without the payment of any royalties thereon or therefor.

BACKGROUND OF THE INVENTION

This invention relates to a specific piezoelectric (P.E.) voltage generator means, specifically a hammer that can be gravity driven or mechanically driven to apply high compressive stress to two or more P.E. crystals that are located adjacent to or in close proximity to a fixed anvil means wherein the voltage generated is transferred to a gas filled discharge tube with high impedance to produce visible light.

Conventionally, the energy for ignition of lights including flash lamps used in portable photographic equipment is obtained from batteries installed in the flashgun or camera. However, batteries are not entirely satisfactory since they deteriorate with use and time, and must be replaced at relatively frequent intervals. Piezoelectric generators have been proposed as a replacement for batteries since they are capable of producing a large amount of energy, have a life commensurate with the rest of the camera and remain relatively stable in performance without significant loss of voltage or electrical capacity.

In a system disclosed in the prior art (U.S. Pat. No. 3,808,418 issued to Conard et al) a piezoelectric crystal is mechanically stressed and the energy produced is used to excite a neon filled tube. This system produces low voltage and extremely low power. This system is neither appropriate to nor capable of producing the high voltage and power regime required for the subject invention. The mechanical means for stressing the crystals is also completely distinct from the structure claimed herein.

Another known method involves using sheets of piezoelectric material arranged as a flexible cantilevered beam structure. When the unsupported end of the beam is displaced and released, the beam rebounds momentarily, touching an electrical contact at the point of maximum beam displacement. The piezoelectric material is delivered to the lamp when the beam rebounds and contacts the lamp terminals. This method requires a large, bulky enclosure to permit the movement of the beam.

Flash-firing mechanism which include a piezoelectric generator for triggering an electronic flash unit are also known in the art. For example, U.S. Pat. No. 2,972,937 issued to C. G. Suits on Feb. 28, 1961, entitled Flash Apparatus discloses a piezoelectric crystal arranged to produce a high voltage impulse to fire a photoflash lamp in timed relation to light-unblocking movement of a camera shutter.

U.S. Pat. No. 3,782,258 issued to Boekkooi et al on Jan. 1, 1974, entitled Ignition Arrangement For a Discharge Tube discloses a piezoelectric generator coupled to an electronic flash unit to initiate conduction of the Xenon in the flashtube. In one embodiment disclosed therein, the piezocrystal output pulse is applied directly to the trigger electrode of the flashtube. In an alternative embodiment, the P.E. crystal pulse is applied to the gate electrode of an silicon controlled rectifier which is turned on to complete a conventional trigger circuit to energize the flashtube.

It has been found that the application of a piezo impulse directly to a flashtube trigger electrode as is done in the first embodiment disclosed in the Boekkooi et al patent does not always operate to fire the flashtube. This is despite the relatively high amplitude of the piezo pulse which may be several thousand volts. It has been theorized that due to the relatively short duration of this pulse, which may be on the order of approximately 5 microseconds or less, the flashtube interelectrode resistance is not sufficiently reduced. When this results, the flash-firing capacitor fails to discharge through the flashtube and a flash does not occur.

In the other embodiment disclosed in the Boekkooi et al patent, the conventional flash-trigger circuit comprises a trigger capacitor, which may be charged to several hundred volts, in parallel with a trigger electrode transformer, the primary winding of which is in series with the aforementioned SCR. This circuit avoids the problem referred to hereinbefore associated with a direct application of the piezo pulse to the triggger electrode.

Accordingly, the inventor has invented an improved mechanism that may be gravity driven or spring driven to produce electrical current by applying sharpely impacted compression on one or more P.E. crystals and transferring that current directly to a gas filled discharge tube having high impedance to produce visible light.

SUMMARY OF THE INVENTION

In the present invention, one or more small piezoelectric (P.E.) crystals are suddenly compressed between a hammer and anvil means at relatively high pressure to produce a high impulse electrical current that is transferred to a gas filled discharge tube such as, for example, a conventional xenon tube or a fluorescent tube, wherein the hammer is spring driven in one embodiment and gravity driven in one other preferred embodiment to produce high impulse current at high voltage for a very short duration.

One principal object of the invention is to provide a light weight power source that does not depend on storage batteries.

Another object is to provide an alternative power source that provides an auxiliary to storage battery power.

A still further object of the invention is to provide a non-expendable manually operated power source and light source that does not have a shelf life problem.

BRIEF DESCRIPTION OF THE DRAWINGS

FIG. 3 is a partly cutaway perspective view of the spring driven hammer embodiment of the light source of this invention in a compressed position.

FIG. 4 is a cross sectional view of the spring driven hammer with the hammer in the extended position.

FIG. 5 is a side elevational view of the compression rod.

DETAILED DESCRIPTION OF THE PREFERRED EMBODIMENT

Figure 1:
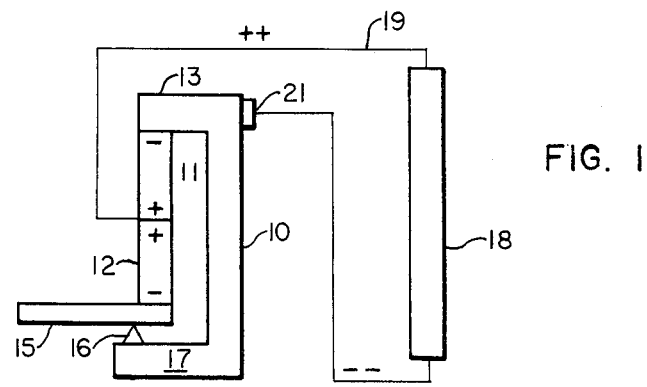
FIG. 1 is a cross sectional view of one embodiment of the invention.

In FIG. 1 a metal conduction container 10 is fitted with two piezoelectric crystal 11 and 12 between the upper end 13 and the lower edge of crystal 12 at point 14. End 14 is in contact with lever 15 that is supported by fulcrum 16. Fulcrum 16 is supported on the lower end. The container 10 with ends 13 and 17 are made of electrically conductible material i.e., copper aluminum or steel alloy. The lever 15 is sized and positioned to provide at least 7,000 psi of sudden, light impact pressure on the two P.E. crystals.

When lever 15 is moved down suddenly to generate at least 0.1 Joule of energy and 1 kilovolt per microinch of axial compression on the P.E. crystals at least one joule of energy is produced.

The gas discharge tube 18 may be any zenon tube, fluorescent or other gas discharge tube that is attached to the container 10 with the plus line 19 (+) being connected at the plus plus (++) interface of the two P.E. crystals and the negative line 20 connected at point 21.

The lever 15 may take the mechanical form of a hammer on point 14 and point 13 may be an anvil, where 7,000 psi pressure is a critical minimum force and where 0.1 Joule of energy is produced.

A single P.E. crystal can be used. In all applications the crystal or crystals should be tightly fitted into a cylinder or other container so as to prevent expansion in the horizontal plane when impacted by the hammer.

In all embodiments the container for the piezoelectric crystals should be in a close tolerance fit so as to prevent lateral expansion at impact by the hammer means.

Figure 2:
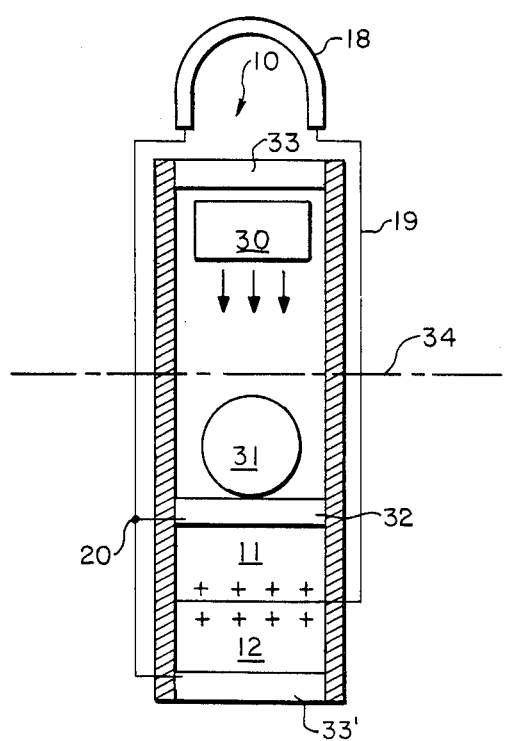
FIG. 2 is a partly cutaway perspective view of the gravity operated light source that may be manually operated or affixed to a rotating device.

In FIG. 2 cylinder 10 is fitted with a hammer 30, that may impact a spherical ball 31 that falls on movable anvil 32. The movable anvil 32 impacts upper P.E. crystal 11 and lower crystal 12 which is retained by a first retaining anvil 33' at one end of the cylinder. Upper retaining anvil 33 defines a second retaining anvil at the other end of the cylinder and contains the hammer 30 and ball 31 within so that the ball 31 and hammer 30 impact movable anvil 32 when end for end rotation of cylinder 10 causes the anvil 32 to be in a lower position having rotated to the lower position around horizontally oriented axis 34. The plus (+) current carrying wire 19 is attached to gas discharge light tube 18 such as a fluorescent tube. The ground wire 20 is attached in FIG. 2.

The ball 31 is driven by gravity force and the ball 31 and hammer 30 move back and forth and strikes the anvil 32 as the cylinder 10 rotates around axis 34. In FIGS. 3 and 4 a hand held device 50, that is partly cutaway with a cylinder 10 contains two P.E. crystals with the two plus sides ++ in contact. Upper anvil 33 is contacted in FIG. 4 by hammer face 30. The hammer 30 is driven by a rod 40 with compressed spring 41. The lower anvil 35 delivers the lower compressive stress at the bottom of cylinder 10. Hand operated lever 42 is pivotally attached to spring compression rod 43. Release slot 44 by sliding by the face of hammer 30 releases the mechanical force of the spring 41 that delivers at least 7,000 psi compression at high impulse to anvil 33. In FIG. 3 the spring 41 is fully compressed and is about to be released as face 45 clears the face of the hammer 30. With every advance of hammer 30 at least 0.1 Joule of energy flows through the gas discharge tube to produce an intermittently light signal. Spring 41 is released by the upward motion of face 45 which is produced as a result of lever 42 rotating about pivot 46, contacting the rear face 49 of slot 48. The rear face of slot 48 pushes rod 43 up, in a lateral direction, from the longitudinal centerline of the hammer 30.

FIG. 5 best illustrates the relationship of compression rod 43 that is attached to lever 46 by pivot pin 47. The slot 48 fits around lever 42 and the rear face 49, at the end of the spring compression stroke forces the rod 43 upward so that face 45 slips over the face of the hammer 30, releasing the hammer. Other release means may be utilized, including a cam and similar apparatus.

To those skilled in the art, many modifications and variations of the present invention are possible in light of the above teachings. It is therefore to be understood that the present invention can be practiced otherwise than as specifically described herein and still will be within the spirit and scope of the appended claims.

What is claimed is:

1. A manually operated light source comprising:
   a cylinder containing at one end two or more piezoelectric crystals arranged with facing opposite polarities between a moveable metallic anvil and a first retaining anvil located at one end of the cylinder;
   said moveable anvil is circular in shape to conform in close tolerance with the interior wall of the cylinder; and,
   a gravity driven hammer slideably mounted within the cylinder for moving back and forth between the moveable anvil and a second retaining anvil located at the other end of the cylinder;
   said cylinder fitted with electrical connection means that connect positive and negative faces of the piezoelectric crystals to a gas-filled discharge tube,
   whereby the cylinder upon being rotated end for end allows the hammer to fall under force of gravity to strike the moveable anvil and cause the piezoelectric crystals to emit an electrical charge for intermittent lighting of the gas-filled tube.

* * * * *